(12) United States Patent
Cho et al.

(10) Patent No.: US 11,027,731 B2
(45) Date of Patent: Jun. 8, 2021

(54) LAUNCH CONTROL METHOD FOR HYBRID VEHICLE

(71) Applicants: HYUNDAI MOTOR COMPANY, Seoul (KR); KIA MOTORS CORPORATION, Seoul (KR)

(72) Inventors: Jin Kuk Cho, Hwaseong-si (KR); Moon Kyung Joo, Seoul (KR); Ji Hyun Park, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/784,438

(22) Filed: Feb. 7, 2020

(65) Prior Publication Data

US 2021/0016774 A1   Jan. 21, 2021

(30) Foreign Application Priority Data

Jul. 15, 2019   (KR) .................. 10-2019-0085049

(51) Int. Cl.
*B60W 10/02* (2006.01)
*B60W 10/06* (2006.01)
(Continued)

(52) U.S. Cl.
CPC ...... *B60W 30/18027* (2013.01); *B60W 10/02* (2013.01); *B60W 10/06* (2013.01);
(Continued)

(58) Field of Classification Search
CPC .... B60W 10/02; B60W 10/026; B60W 10/06; B60W 10/08; B60W 20/10; B60W 20/13; B60W 20/15; B60W 20/19; B60W 20/40; B60W 30/18027; B60W 2510/06; B60W 2520/04; B60W 2540/10; B60W 2540/12; B60W 2710/021; B60W 2710/271; B60W 2710/025; B60W 2710/0644;
(Continued)

(56) References Cited

U.S. PATENT DOCUMENTS

2015/0065297 A1* 3/2015 Hoshiba ................ B60W 10/08
477/19
2015/0344018 A1* 12/2015 Shimoyama ........... B60K 6/547
701/22

(Continued)

*Primary Examiner* — Edwin A Young
(74) *Attorney, Agent, or Firm* — Morgan, Lewis & Bockius LLP

(57) ABSTRACT

A launch control method for a hybrid vehicle includes: determining an intent of a driver to execute a launch control mode in a state in which an engine is turned-off; when the intent of the driver is to execute the launch control mode, starting the engine and controlling an engine speed; performing a slip control on a slip element of a transmission input terminal; when the engine speed is synchronized with a motor speed or a difference between the engine speed and the motor speed is less than a predetermined range, locking up an engine clutch; when the engine clutch is locked up, performing an engine pre-boosting control to raise an engine torque to a torque at which battery charging is available due to a motor; performing a take-up control on the slip element; and when the take-up control is terminated, locking up the slip element.

20 Claims, 8 Drawing Sheets

(51) Int. Cl.
*B60W 10/08* (2006.01)
*B60W 30/18* (2012.01)
*B60W 20/15* (2016.01)

(52) U.S. Cl.
CPC ............ *B60W 10/08* (2013.01); *B60W 20/15* (2016.01); *B60W 2510/0241* (2013.01); *B60W 2510/0638* (2013.01); *B60W 2710/0644* (2013.01); *B60W 2710/0666* (2013.01); *B60W 2710/105* (2013.01)

(58) Field of Classification Search
CPC ... B60W 2710/0666; B60W 2710/081; B60W 2710/083; B60W 2710/1022
See application file for complete search history.

(56) References Cited

U.S. PATENT DOCUMENTS

| | | | |
|---|---|---|---|
| 2016/0272192 A1* | 9/2016 | Ashizawa | B60K 6/387 |
| 2017/0120896 A1* | 5/2017 | Thompson | B60W 10/023 |
| 2018/0354493 A1* | 12/2018 | Johri | B60W 30/18027 |
| 2019/0039599 A1* | 2/2019 | Hawley | B60W 10/06 |

* cited by examiner

[FIG. 1]
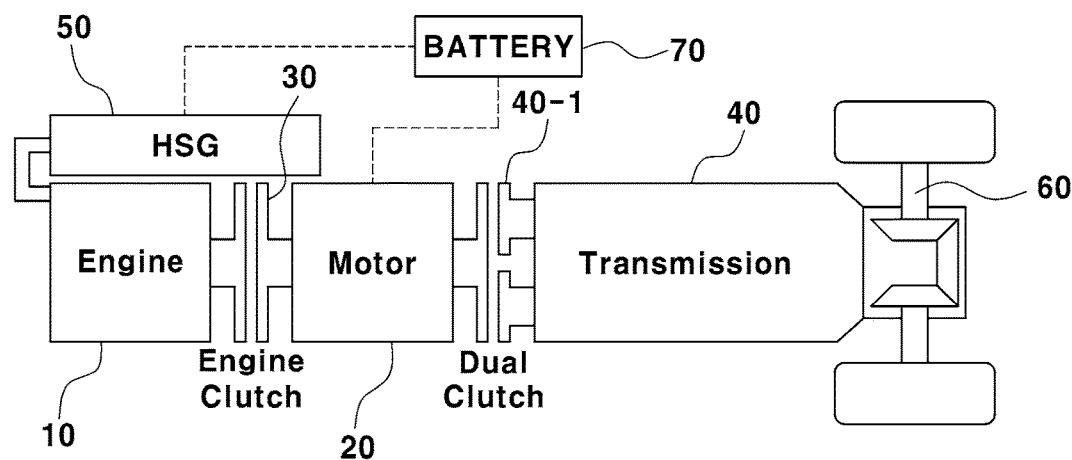
[FIG. 2]
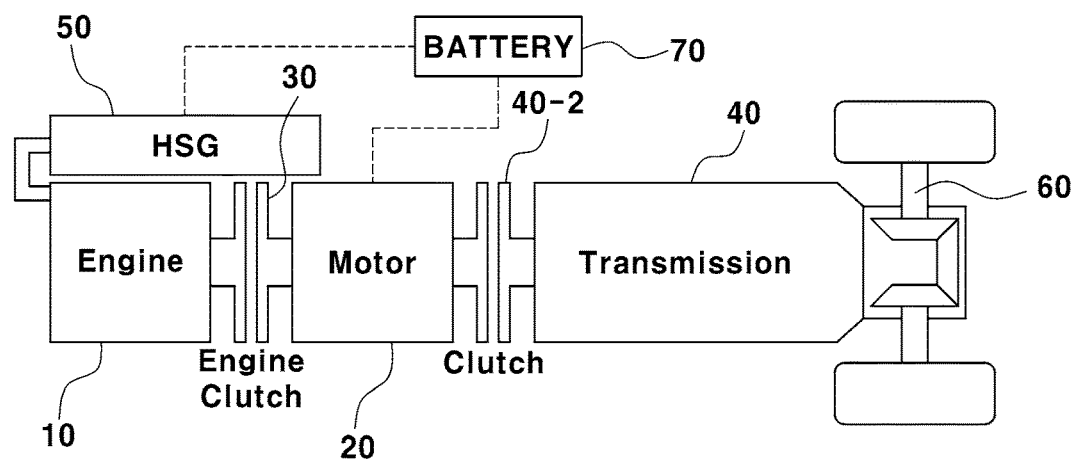

[FIG. 3]
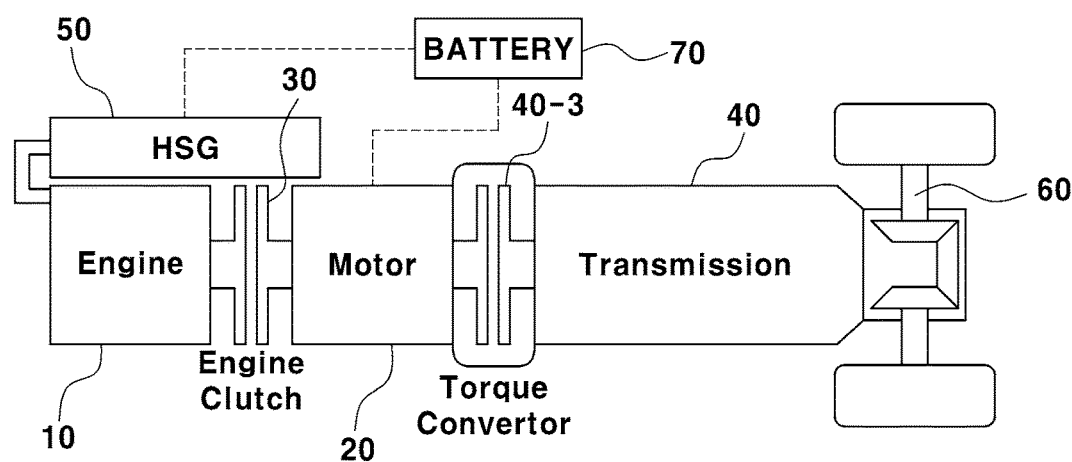

[FIG. 4]
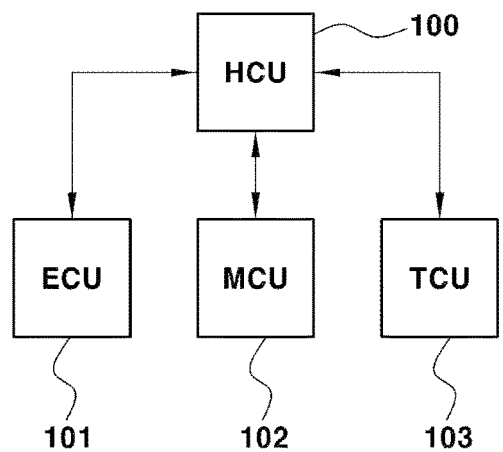
[FIG. 5]
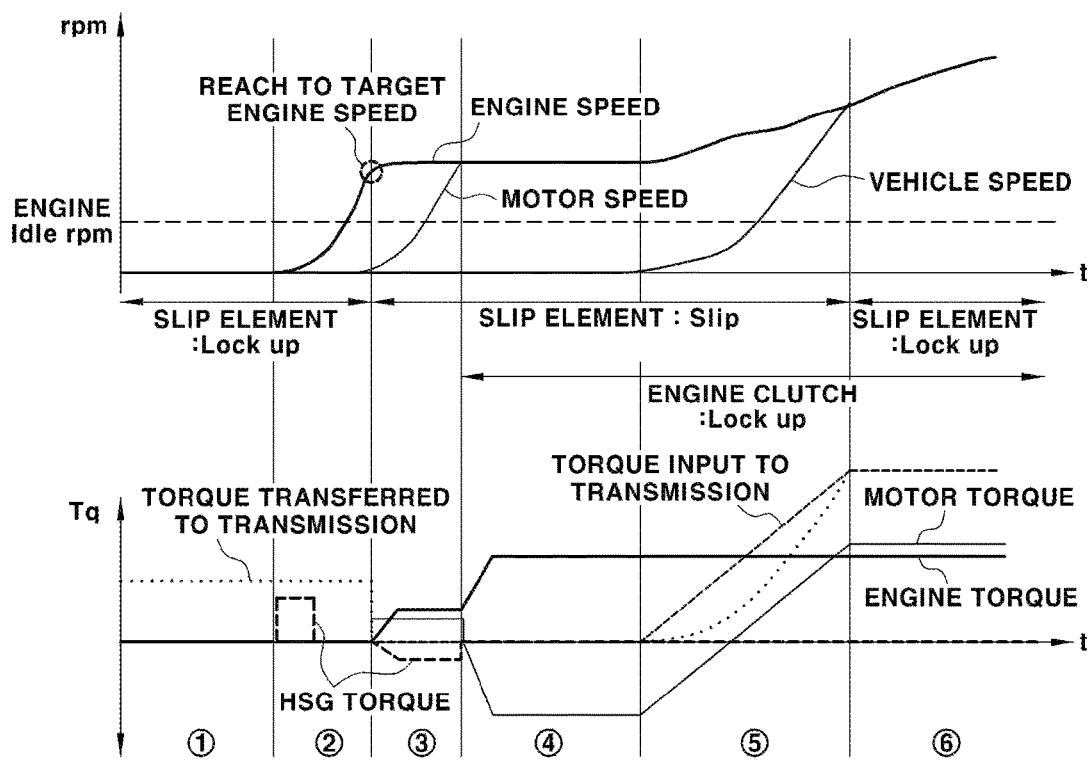

[FIG. 6]

| CONTROL SEQUENCE | ① DETERMINE WHETHER LAUNCH CONTROL MODE IS EXECUTED | ② ENGINE STARTING AND SPEED CONTROL | ③ SLIP CONTROL ON SLIP ELEMENT OF TRANSMISSION INPUT TERMINAL |
|---|---|---|---|
| ENGINE | OFF | STARTING AND SPEED CONTROL | IDLE SPEED CONTROL OR PART LOAD SPEED CONTROL |
| MOTOR | SPEED 0 | SPEED 0 | MOTOR SPEED CONTROL |
| ENGINE OPERATING POINT | - | Idle or Part load | Part load or Full load |
| ENGINE CLUTCH State | Open | Open | Open |
| SLIP ELEMENT OF TRANSMISSION INPUT TERMINAL | Lock up | Lock up | Slip(TRANSFERRED TORQUE CONTROL) |
| TARGET TRANSFERRED TORQUE OF SLIP ELEMENT OF TRANSMISSION INPUT TERMINAL | - | - | CAL(=0) |
| DRIVING MODE EV : 0 HEV : 1 | 0 | 1 | 1 |

| CONTROL SEQUENCE | ④ ENGAGEMENT OF ENGINE CLUTCH (LOCK-UP) AND ENGINE PRE-BOOSTING | ⑤ TAKE-UP CONTROL | ⑥ HEV |
|---|---|---|---|
| ENGINE | ENGINE PRE-BOOSTING TQ | DRIVER REQUEST TORQUE = MOTOR TORQUE + ENGINE TORQUE(Part\|\|Full load) | DRIVER REQUEST TORQUE = MOTOR TORQUE + ENGINE TORQUE(Part\|\|Full load) |
| MOTOR | ENGINE PRE-BOOSTING LOAD | | |
| ENGINE OPERATING POINT | Part load or Full load | | |
| ENGINE CLUTCH State | Open → Slip → Lock up | Lock up | Lock up |
| SLIP ELEMENT OF TRANSMISSION INPUT TERMINAL | Slip(TRANSFERRED TORQUE CONTROL) | Slip(Take-up) | Lock up |
| TARGET TRANSFERRED TORQUE OF SLIP ELEMENT OF TRANSMISSION INPUT TERMINAL | CAL(=0) | TRANSFERRED TORQUE FOR TAKE-UP CONTROL (TCU DETERMINATION) | DRIVER REQUEST TORQUE |
| DRIVING MODE EV : 0 HEV : 1 | 1 | 1 (0 WHEN BEING SWITCHED TO EV) | 1 (0 WHEN BEING SWITCHED TO EV) |

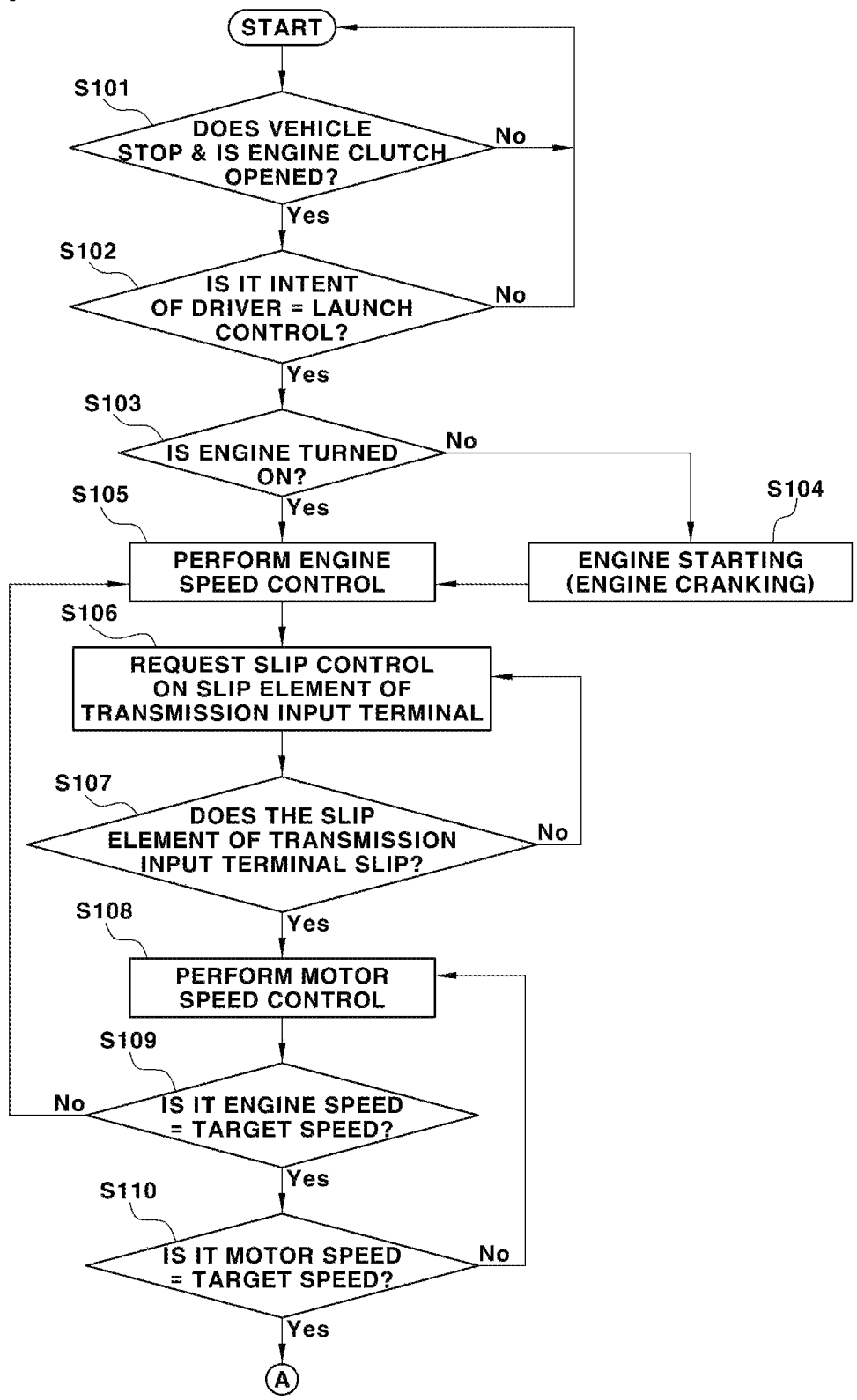
[FIG. 7A]

[FIG. 7B]
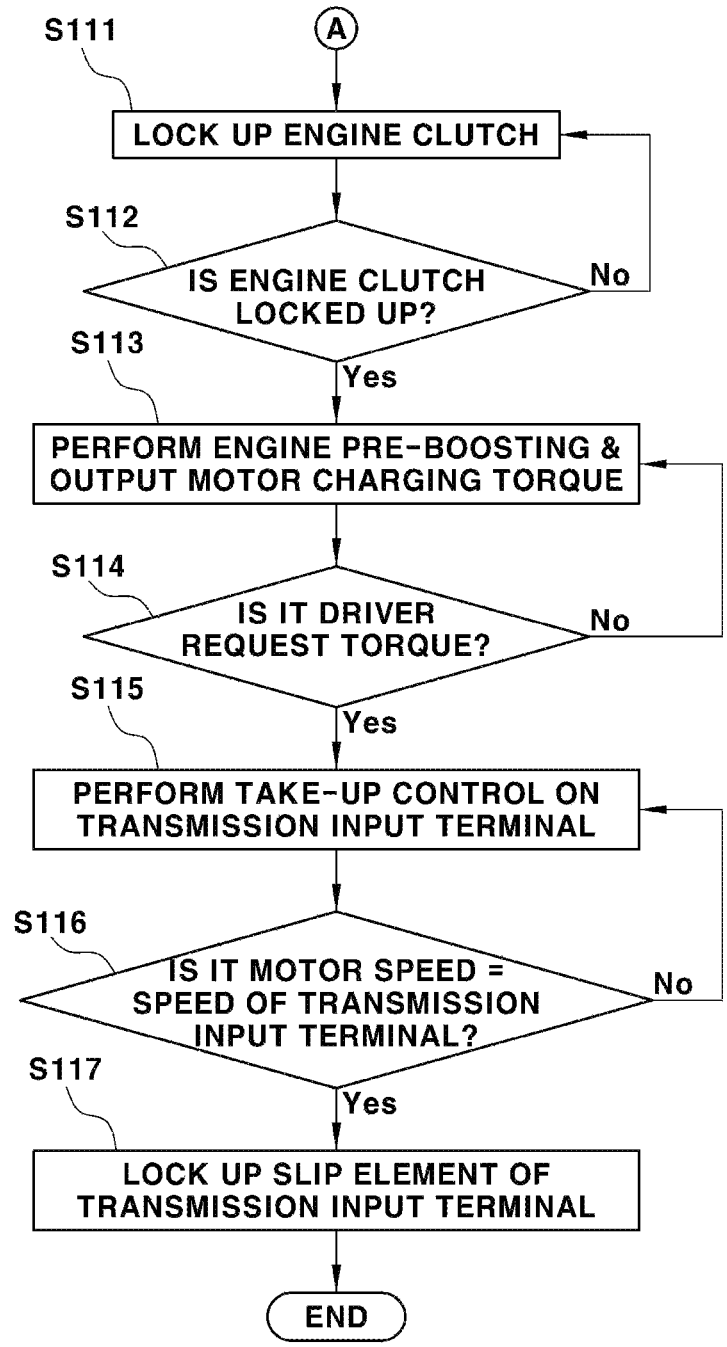

[FIG. 8]
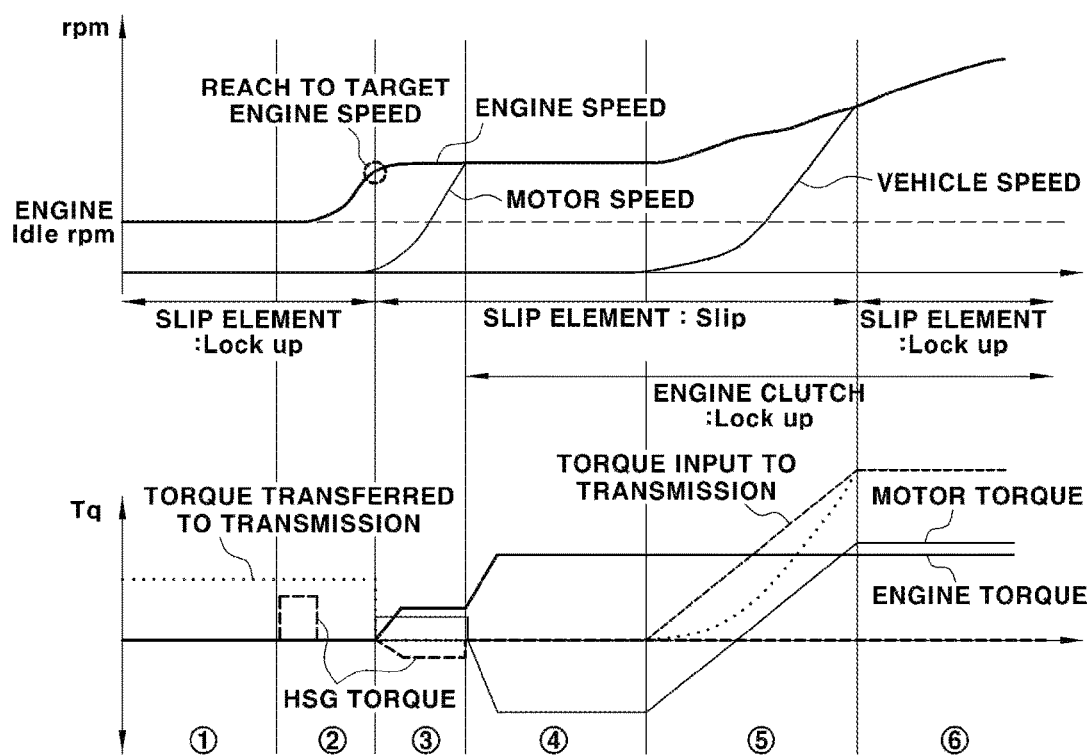

[FIG. 9]

| CONTROL SEQUENCE | ① DETERMINE WHETHER LAUNCH CONTROL MODE IS EXECUTED | ② ENGINE SPEED CONTROL | ③ SLIP CONTROL ON SLIP ELEMENT OF TRANSMISSION INPUT TERMINAL |
|---|---|---|---|
| ENGINE | ON | SPEED CONTROL | IDLE SPEED CONTROL OR PART LOAD SPEED CONTROL |
| MOTOR | SPEED 0 | SPEED 0 | MOTOR SPEED CONTROL |
| ENGINE OPERATING POINT | Idle | Idle or Part load | Part load or Full load |
| ENGINE CLUTCH State | Open | Open | Open |
| SLIP ELEMENT OF TRANSMISSION INPUT TERMINAL | Lock up | Lock up | Slip(TRANSFERRED TORQUE CONTROL) |
| TARGET TRANSFERRED TORQUE OF SLIP ELEMENT OF TRANSMISSION INPUT TERMINAL | - | - | CAL(=0) |
| DRIVING MODE EV : 0 HEV : 1 | 0 | 1 | 1 |

| CONTROL SEQUENCE | ④ Pre boosting: ENGAGEMENT OF ENGINE CLUTCH (LOCK-UP) AND ENGINE PRE-BOOSTING | ⑤ TAKE-UP CONTROL | ⑥ HEV |
|---|---|---|---|
| ENGINE | ENGINE PRE-BOOSTING TQ | DRIVER REQUEST TORQUE = MOTOR TORQUE + ENGINE TORQUE(Part‖Full load) | DRIVER REQUEST TORQUE = MOTOR TORQUE + ENGINE TORQUE(Part‖Full load) |
| MOTOR | ENGINE PRE-BOOSTING LOAD | | |
| ENGINE OPERATING POINT | Part load or Full load | | |
| ENGINE CLUTCH State | Open → Slip → Lock up | Lock up | Lock up |
| SLIP ELEMENT OF TRANSMISSION INPUT TERMINAL | Slip(TRANSFERRED TORQUE CONTROL) | Slip(Take-up) | Lock up |
| TARGET TRANSFERRED TORQUE OF SLIP ELEMENT OF TRANSMISSION INPUT TERMINAL | CAL(=0) | TRANSFERRED TORQUE FOR TAKE-UP CONTROL (TCU DETERMINATION) | DRIVER REQUEST TORQUE |
| DRIVING MODE EV : 0 HEV : 1 | 1 | 1 (0 WHEN BEING SWITCHED TO EV) | 1 (0 WHEN BEING SWITCHED TO EV) |

LAUNCH CONTROL METHOD FOR HYBRID VEHICLE

CROSS-REFERENCE TO RELATED APPLICATION

This application claims the benefit of priority to Korean Patent Application No. 10-2019-0085049 filed on Jul. 15, 2019, the entire contents of which are incorporated herein by reference.

TECHNICAL FIELD

The present disclosure relates to a launch control method for a hybrid vehicle. More particularly, it relates to a launch control method for a hybrid vehicle, which is capable of improving launch acceleration performance of the hybrid vehicle by reflecting an acceleration intent of a driver.

BACKGROUND

As shown in power transfer block diagrams of FIGS. 1 to 3, a powertrain of a hybrid vehicle may include an engine 10, a motor 20, an engine clutch 30 disposed between the engine 10 and the motor 20 and configured to transfer or disconnect engine power, a transmission 40 configured to shift a gear and output the engine power to a drive shaft 60 for driving, a hybrid start generator (HSG) 50 connected to a crank pulley of the engine 10 and configured to perform an engine starting and generate electricity, and a battery 70 connected to the motor 20 and the HSG 50 so as to be chargeable or dischargeable.

Further, a dual clutch 40-1 for implementing a high gear shift of five or more gear stages as shown in FIG. 1, a single clutch 40-2 for connecting or disconnecting power which is input to the transmission 40 as shown in FIG. 2, or a torque converter 40-3 which is a type of a fluid clutch as shown in FIG. 3 may be connected to a transmission input terminal as a slip element.

The hybrid vehicle provides driving modes such as an electric vehicle (EV) mode using only a motor torque, a hybrid EV (HEV) mode in which a torque of a motor is used as an auxiliary torque while a torque of an engine is used as a main torque, and a regenerative braking mode in which, during driving due to braking or inertia, braking energy or inertia energy is recovered through power generation of the motor to charge a battery.

As described above, the hybrid vehicle generally launches in the EV mode, engages an engine clutch by performing an engine starting and speed control during acceleration, and then transmits an output of the engine to a drive shaft through a transmission. However, if an allowable input torque of the transmission is greater than a maximum torque of the motor and a maximum allowable input torque of the transmission is directly transferred to vehicle wheels such that launch performance is improved, it will be advantageous that torques of the motor and the engine are output according to the maximum allowable input torque of the transmission, as compared with launching of the hybrid vehicle in the EV mode.

The above information disclosed in this Background section is only for enhancement of understanding of the background of the disclosure and therefore it may contain information that does not form the prior art that is already known to a person of ordinary skill in the art.

SUMMARY OF THE DISCLOSURE

The present disclosure has been made in an effort to solve the above-described problems associated with prior art.

An aspect of the present disclosure provides a launch control method for a hybrid vehicle having a slip element on which slip control is performable between a motor and a transmission, the launch control method including determining execution of a launch control mode so as to reflect an acceleration intent of a driver and launching a hybrid electric vehicle (HEV) mode through a process of synchronizing an engine and a motor speed and locking up an engine clutch, a process of performing the slip control with respect to the slip element, a process of performing engine pre-boosting control, a process of performing a take-up control to adjust a torque which is input to a transmission input terminal, and a process of locking up the slip element, thereby improving acceleration performance of the hybrid vehicle.

According to an aspect of the present disclosure, a launch control method for a hybrid vehicle, having a slip element on which slip control is performable between a motor and a transmission, includes determining, by a hybrid control unit (HCU), an intent of a driver to execute a launch control mode in a state in which an engine is turned-off; when the intent of the driver is to execute the launch control mode, starting, by an engine control unit (ECU) which has received a speed command from the hybrid control unit (HCU), the engine and controlling an engine speed; performing, by a transmission control unit (TCU) operating cooperatively with the HCU, the slip control on a slip element of a transmission input terminal; when the engine speed is synchronized with a motor speed or a difference between the engine speed and the motor speed is less than a predetermined range, locking up, by the ECU, an engine clutch; when the engine clutch is locked up, performing, by the HCU, an engine pre-boosting control to raise an engine torque to a torque at which battery charging is available due to a motor; performing, by the TCU, a take-up control on the slip element; and when the take-up control is terminated, locking up, by the TCU, the slip element.

When a driving mode satisfies an electric vehicle (EV) mode state, an engine satisfies a turned-off state, the motor speed satisfies a zero state, the engine clutch satisfies an opened state, and the slip element of the transmission input terminal satisfies a lock-up state, the method may include determining, by the HCU, the intent of the driver to execute the launch control mode.

In the determining of the intent of the driver to execute the launch control mode, when the HCU receives all of a traction control system (TCS) off signal, a brake pedal on signal, and an accelerator pedal on signal, the method may include determining, by the HCU, the driver as having the intent to execute the launch control mode.

In the determining of the intent of the driver to execute the launch control mode, when the HCU receives all of a TCS off signal, a brake pedal on signal, and a signal indicating that a driving mode select switch is selected to a sport mode, the method may include determining, by the HCU, the driver as having the intent to execute the launch control mode.

Performing, by the ECU, the engine starting and the engine speed control may be performed at a target engine speed at which the engine is capable of outputting a preset torque after engine cranking in a state in which the slip element of the transmission input terminal is maintained in a lock-up state and the engine clutch is maintained in an opened state.

The performing of the slip control on the slip element of the transmission input terminal may include switching, by the TCU, the slip element from a lock-up state to a slip state in a state in which the engine clutch is opened, and, when the slip element becomes in the slip state, controlling the motor speed to meet a target engine speed due to motor speed control by the MCU.

A transferred torque, which is transferred from a transmission to a drive shaft due to the slip control on the slip element of the transmission input terminal, may be output as 0 Nm or a torque at which the vehicle performs a creep launch.

A motor may be driven to perform power generation for battery charging using an engine torque in the performing of the engine pre-boosting control and, simultaneously, may output a torque at which a creep launch is available with a drive shaft in performing the slip control on the slip element of the transmission input terminal.

The performing of the take-up control may include determining, by the TCU, an ascending slope of a torque which is input to the transmission input terminal and raising the torque, which is input to the transmission input terminal, to a driver request torque with the determined ascending slope of the torque; and the ascending slope of the torque, which is determined by the TCU, is set by controlling an ascending slope of a motor torque.

When the torque which is input to the transmission input terminal is checked as being raised to the driver request torque, and the motor speed is checked as being synchronized with a speed of the transmission input terminal, the locking up of the slip element of the transmission input terminal may be performed.

According to another aspect of the present disclosure, a launch control method for a hybrid vehicle, having a slip element on which a slip control is performable between a motor and a transmission, includes: determining, by a hybrid control unit (HCU), an intent of a driver to execute a launch control mode in a state in which an engine is turned on and in an idle state; when the intent of the driver is to execute the launch control mode, performing, by an engine control unit (ECU) which has received a speed command from the hybrid control unit (HCU), an engine speed control; performing, by a transmission control unit (TCU) operating cooperatively with the HCU, the slip control on the slip element of a transmission input terminal; when an engine speed is synchronized with a motor speed or a difference between the engine speed and the motor speed is less than a predetermined range, locking up, by the HCU, an engine clutch; when the engine clutch is locked up, performing, by the ECU, an engine pre-boosting control to raise an engine torque to a torque at which battery charging is available by a motor; performing, by the TCU, a take-up control on the slip element; and when the take-up control is terminated, locking up, by the TCU, the slip element.

When a driving mode satisfies an electric vehicle (EV) mode state, an engine satisfies a turned-on state and the idle state, the motor speed satisfies a zero state, the engine clutch satisfies an opened state, and the slip element of the transmission input terminal satisfies a lock-up state, determining, by the HCU, the intent of the driver to execute the launch control mode.

In the determining of the intent of the driver to execute the launch control mode, when the HCU receives all of a traction control system (TCS) off signal, a brake pedal on signal, and an accelerator pedal on signal, the method may include determining, by the HCU, the driver as having the intent to execute the launch control mode.

In the determining of the intent of the driver to execute the launch control mode, when the HCU receives all of a TCS off signal, a brake pedal on signal, and a signal indicating that a driving mode select switch is selected to a sport mode, the method may include determining, by the HCU, the driver as having the intent to execute the launch control mode.

Performing, by the ECU, of the engine speed control is performed at a target engine speed at which the engine is capable of outputting a preset torque in a state in which the slip element of the transmission input terminal is maintained in a lock-up state and the engine clutch is maintained in an opened state.

The performing of the slip control on the slip element of the transmission input terminal may include switching, by the TCU, the slip element from a lock-up state to a slip state in a state in which the engine clutch is opened, and, when the slip element becomes in the slip state, controlling the motor speed to meet a target engine speed due to motor speed control by the MCU.

A transferred torque, which is transferred from a transmission to a drive shaft due to the slip control on the slip element of the transmission input terminal, may be output as 0 Nm or a torque at which the vehicle performs a creep launch.

A motor may be driven to perform power generation for battery charging using an engine torque in the performing of the engine pre-boosting control and, simultaneously, may output a torque at which a creep launch is available with a drive shaft in the performing the slip control on the slip element of the transmission input terminal.

The performing of the take-up control may include determining, by the TCU, an ascending slope of a torque which is input to the transmission input terminal and raising the torque, which is input to the transmission input terminal, to a driver request torque with the determined ascending slope of the torque; and the ascending slope of the torque, which is determined by the TCU, is set by controlling an ascending slope of a motor torque.

When the torque which is input to the transmission input terminal is checked as being raised to the driver request torque, and the motor speed is checked as being synchronized with a speed of the transmission input terminal, the locking up of the slip element of the transmission input terminal may be performed.

Other aspects and embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein:

FIGS. 1 to 3 are power transfer block diagrams views illustrating a configuration of a powertrain of a hybrid vehicle;

FIG. 4 is a block diagram illustrating a configuration of a controller for a launch control method of a hybrid vehicle according to an exemplary embodiment of the present disclosure;

FIG. 5 shows a speed graph and a torque graph illustrating the launch control method of a hybrid vehicle according to an exemplary embodiment of the present disclosure;

FIG. 6 is a diagram showing a table in which the launch control method of a hybrid vehicle according to an exemplary embodiment of the present disclosure is classified according to stages;

FIGS. 7A and 7B are flowcharts illustrating the launch control method of a hybrid vehicle according to an exemplary embodiment of the present disclosure;

FIG. 8 shows a speed graph and a torque graph illustrating a launch control method of a hybrid vehicle according to another exemplary embodiment of the present disclosure; and FIG. 9 is a diagram showing a table in which the launch control method of a hybrid vehicle according to another exemplary embodiment of the present disclosure is classified according to stages.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, exemplary embodiments of the present disclosure will be described in detail with reference to the accompanying drawings.

As described above with reference to FIGS. 1 to 3, a powertrain of a hybrid vehicle may include an engine 10, a motor 20, an engine clutch 30 disposed between the engine 10 and the motor 20 and configured to transfer or disconnect engine power, a transmission 40 configured to shift a gear and output the engine power to a drive shaft 60 for driving, a hybrid start generator (HSG) 50 connected to a crank pulley of the engine 10 and configured to perform an engine starting and generate electricity, and a battery 70 connected to the motor 20 and the HSG 50 so as to be chargeable or dischargeable. A dual clutch 40-1 for implementing a high gear shift of five or more gear stages as shown in FIG. 1, a single clutch 40-2 for connecting or disconnecting power which is input to the transmission 40 as shown in FIG. 2, or a torque converter 40-3 which is a type of a fluid clutch as shown in FIG. 3 may be connected to a transmission input terminal as a slip element.

The present disclosure is characterized by improving launch acceleration performance through launch control to which an acceleration intent of a driver in the above-described hybrid vehicle having the slip element on which slip control is performable. To this end, as shown in FIG. 4, as a main controller, an engine control unit (ECU) 101 for controlling an engine and an engine clutch, a motor control unit (MCU) 102 for controlling the motor and a starter generator, and a transmission control unit (TCU) 103 for controlling a transmission and a slip element are included as lower-level controllers. A hybrid control unit (HCU) 100, which is responsible for overall control with respect to the lower-level controllers (e.g., for outputting a torque command with respect to torques which the engine and the motor should output, or a target speed command with respect to the engine), is included as a high-level controller.

According to an exemplary embodiment of the present disclosure, the hybrid vehicle having the slip element, on which the slip control is performable between the motor and the transmission, is launchable in a hybrid electric vehicle (HEV) mode by a launch control mode in state in which an EV mode is set. As reference drawings, FIG. 5 shows a speed graph and a torque graph illustrating the launch control method of a hybrid vehicle according to an exemplary embodiment of the present disclosure, FIG. 6 is a diagram showing a table in which the launch control method of a hybrid vehicle according to an exemplary embodiment of the present disclosure is classified according to stages, and FIGS. 7A and 7B are flowcharts illustrating the launch control method of a hybrid vehicle according to an exemplary embodiment of the present disclosure.

First, in a state in which an engine starting is turned off, an intent of a driver to execute the launch control mode is determined (see section ① of FIGS. 5 and 6)

To this end, the HCU 100 checks that a vehicle stops and an engine clutch is opened in a state in which the engine starting is turned off (S101) and then checks an acceleration intent of the driver, i.e., an intent of the driver to execute the launch control mode (S102).

Further, as a precondition for checking the intent of the driver to execute the launch control mode, the HCU 100 checks whether a driving mode satisfies an EV mode state, the engine satisfies a turned-off state, a motor speed satisfies a zero state, the engine clutch satisfies an opened state, and the slip element of a transmission input terminal satisfies a lock-up state. When the precondition is satisfied, the HCU 100 checks the intent of the driver to execute the launch control mode.

The HCU 100 may check whether the driving mode is in the EV mode state, the engine is in the turned-off state, the motor speed is in the zero state, the engine clutch is in the opened state, and the slip element of the transmission input terminal is in the lock-up state through vehicle information provided from the ECU 101, the MCU 102, and the TCU 103. In addition, the HCU 100 checks the intent of the driver to execute the launch control mode on the basis of traction control system (TCS) on/off signals, detected signals of a brake pedal sensor (BPS) and an accelerator pedal sensor (APS), and the like.

As an example of a method of checking the intent of the driver to execute the launch control mode, when the HCU 100 simultaneously receives a TCS off signal indicating that a TCS, which is a kind of braking control device for preventing idling of tire when the driver accelerates during starting or driving, is turned off, a brake pedal on signal detected by the BPS when the driver steps on a brake pedal, and an accelerator pedal on signal detected by the APS when the driver steps on an accelerator pedal at a predetermined level (e.g., APS=100%), the HCU 100 may determine that the driver has the intent to execute the launch control mode.

For example, when the driver takes an action of stepping on the brake pedal on one foot and stepping on the accelerator pedal on the other foot, the brake pedal on signal and the accelerator pedal on signal may be detected.

As another example of the method of checking the intent of the driver to execute the launch control mode, when the HCU 100 simultaneously receives the TCS off signal indicating that the TCS, which is a kind of braking control device for preventing idling of tire when the driver accelerates during starting or driving, is turned off, the brake pedal on signal detected by the BPS when the driver steps on the brake pedal, and a signal indicating that the driver selects a sport mode among an eco-mode, a normal mode, the sport mode of a driving travel mode selection switch, the HCU 100 may determine that the driver has the intent to execute the launch control mode.

The method of checking the intent of the driver to execute the launch control mode may be set by a combination of a plurality of conditions in addition to the above-described two conditions. For example, a research developer may set the method of checking the intent of the driver to execute the launch control mode with various manipulation patterns which are distinctly distinguished from driving manipulation patterns of a usual driver. Alternatively, a separate switch for executing a launch control mode, which is manipulatable in a state in which the brake pedal is stepped on, may be installed around a driver seat.

Next, as described above, when the driver is determined as having the intent to execute the launch control mode, an engine starting and speed control are performed (see section ② of FIGS. 5 and 6).

For example, the HCU 100 receives engine information from the ECU 101 to check whether the engine is turned on or off (S103). When the engine is in a turned-off state, the HCU 100 transmits an engine cranking signal to the ECU 101 so that engine cranking is performed due to engine starting control of the ECU 101 (S104), and then engine speed control is performed (S105).

The ECU 101 performs the engine speed control at a target speed (rpm) at which the engine may output a sufficient torque after the engine cranking, i.e., a target engine speed at which the engine may output a preset torque.

The ECU 101 may perform the engine speed control. However, when the HSG which is capable of controlling the engine speed is mounted, the engine speed control may be performed using the HSG. Alternatively, the HSG is not mounted, the ECU 101 performs the engine speed control.

In this case, the engine and the motor are in a turned-on state, the slip element of the transmission input terminal is in the lock-up state, and the engine is driven at an idle operating point or a part load operating point. However, since the engine clutch is maintained in the opened state, engine power is not transferred to the transmission input terminal.

For reference, in addition to the idle operating point, an engine driving force (engine operating point) of the hybrid vehicle is classified into the part load operating point at which an optimum engine torque or more is output when the engine is driven at an engine lambda (theoretical air-fuel ratio), and a full load operating point for outputting a maximum torque that the engine may output.

Next, slip control with respect to the slip element (e.g., a clutch or a torque converter) at the transmission input terminal is performed (see section ③ of FIGS. 5 and 6).

For example, when the HCU 100 requests the TCU 103 to perform the slip control with respect to the slip element of the transmission input terminal while controlling the engine speed at the target engine speed as described above (S106), the TCU 103 controls to switch the slip element of the transmission input terminal from the lock-up state to a slip state and, subsequently, the HCU 100 checks whether the slip element is in the slip state (S107). When the slip element is in the slip state, the HCU 100 transmits a motor speed control command to the MCU 102 so that the motor speed is controlled according to the target engine speed due to the motor speed control by the MCU 102 (S108).

In this case, the engine clutch is continuously maintained in the opened state, and the engine is driven at the part load operating point or the full load operating point so as to increase the engine speed to the target engine speed.

In particular, a transferred torque value, which is transmitted from the transmission 40 to the drive shaft 60 due to the slip control with respect to the slip element of the transmission input terminal, is output as 0 Nm or a torque in which the vehicle may perform a creep launch instead of a driver request torque which is determined by an amount of depression of the accelerator pedal by the driver. The reason is to improve launch efficiency using a motor output together with an engine output in order for launch acceleration to which the acceleration intent of the driver is reflected.

Next, the engine clutch 30 between the engine 10 and the motor 20 is locked up (see section ④ of FIGS. 5 and 6).

That is, when the engine speed is synchronized with the motor speed or a difference between the engine speed and the motor speed is within a predetermined range (e.g., 300 rpm or less), the engine clutch 30 between the engine 10 and the motor 20 is locked up.

For example, the HCU 100 checks whether the engine speed reaches the target engine speed (S109) and, simultaneously, checks whether the motor speed reaches a target motor speed coincident with the target engine speed on the basis of the information from the MCU 102 (S110).

When the engine speed is checked as being synchronized with the motor speed, the ECU 101 controls the engine clutch 30 to be locked up (S111).

In particular, when whether the engine clutch 30 is locked up is checked (S112) and then the engine clutch 30 is determined as being engaged, engine pre-boosting control is performed to raise the engine torque to a torque at which battery charging is possible due to the motor 20 (S113).

For example, since the engine clutch 30 is engaged and then an output shaft of the engine 10 and a rotating shaft of the motor 20 are synchronized and connected, the ECU 101 performs the engine pre-boosting control which raises the engine torque to a torque at which the motor 20 may charge the battery 70 in addition to the transferred torque which is transmitted from the motor 20 to the drive shaft 60 through the slip element of the transmission input terminal (e.g., a torque which is not the driver request torque but allows the vehicle to perform the creep launch).

In this case, the engine 10 is continuously driven at the part load operating point or the full load operating point, and the motor 20 becomes in a state of receiving an engine pre-boosting load due to the engine pre-boosting control.

Thus, according to the engagement of the engine clutch 30, the motor 20 performs power generation driving for battery charging using the engine torque due to the engine pre-boosting control. Simultaneously, the motor 20 outputs the transferred torque to the drive shaft 60 due to the slip control with respect to the slip element of the transmission input terminal (e.g., the torque at which the vehicle may perform the creep launch instead of the driver request torque).

As described above, unlike a case in which the engine torque is wasted as thermal energy through slip in the slip element, the engine torque, which is raised in advance, may be recovered through the engine pre-boosting control to generate electric power, the generated electric power may be stored in the battery 70 to increase system efficiency, and a torque generation delay of the engine 10 (e.g., a turbo lag in the case of using a turbo engine) may be prevented in terms of performance.

Next, a launch intent of the driver, i.e., whether the driver request torque is present, is checked (S114) and then take-up control is performed with respect to the slip element of the transmission input terminal (S115) (see section ⑤ of FIGS. 5 and 6).

The take-up control refers to a process of recognizing that the vehicle is ready to launch in the HEV mode using both the engine power and motor power, and a process in which the vehicle attempts to launch.

For example, when the HCU 100 checks the driver request torque according to the amount of depression of the accelerator pedal by the user and then recognizes a state in which the engine 10 is synchronized with the motor speed and thus the HEV mode is possible on the basis of information received from the ECU 101 and the MCU 102, the HCU 100 commands the TCU 103 to perform take-up control.

The take-up control refers to a control process of locking up the slip element of the transmission input terminal at a level of the driver request torque (the sum of a motor torque and the engine torque) in the slip state. Even in the take-up control, the slip element of the transmission input terminal is maintained in the slip state.

Thus, as a process of the take-up control, the TCU 103 determines an ascending slope of a torque which is input to the transmission input terminal and raises the torque which is input to the transmission input terminal to the driver request torque using the determined ascending slope of the torque.

Control for satisfying the ascending slope of the torque which is determined by the TCU 103 may be performed by controlling an ascending slope of the motor torque. This is because a degree of freedom for controlling the ascending slope of the torque of the motor 20 is higher than that of the engine 10 such that the acceleration delay may be shortened as compared with using the engine torque.

Further, the ascending slope of the torque which is determined by the TCU 103 is set to a value for preventing divergence of a rotation speed of a driving component (the engine 10 or the motor 20) of the transmission input terminal and securing launch driving ability of the vehicle due to the torque which is transmitted to the driving shaft 60.

Further, in the process of the take-up control, when a rapid progress of the take-up control is required, the engine torque may be adjusted up to the maximum engine torque.

Next, when the take-up control is terminated, the slip element of the transmission input terminal is locked up (see section ⑥ of FIGS. 5 and 6).

That is, when the TCU 103 checks that the torque which is input to the transmission input terminal is raised up to the driver request torque and the motor speed is synchronized with a rotation speed of the transmission input end (S116), the TCU 103 locks up the slip element of the transmission input terminal (S117).

Accordingly, a difference between the rotation speed of the transmission input terminal and the rotation speeds of the engine 10 and the motor 20 becomes smaller and thus the rotation speed of the transmission input terminal is synchronized with the rotation speeds of the engine 10 and the motor 20, and the slip element of the transmission input terminal is locked up so that output torques of the engine 10 and the motor 20 are transmitted to the drive shaft 60 without loss. Consequently, the vehicle launches in the HEV mode.

According to an exemplary embodiment of the present disclosure, in order to perform the launch control on the hybrid vehicle having the slip element on which the slip control is performable between the motor and the transmission, the execution of the launch control is determined in a state of setting the EV mode, and then the hybrid vehicle is allowed to launch in the HEV mode through the process of the engine starting, the process of synchronizing the engine speed with the motor speed, the process of engaging the engine clutch, the process of performing the slip control on the slip element of the transmission input terminal, and the process of performing the take-up control for adjusting the torque which is input to the transmission input terminal. Consequently, the launch acceleration performance of the hybrid vehicle may be improved and a maximum acceleration occurrence delay time point of the hybrid vehicle may be advanced.

Further, according to the above-described exemplary embodiment of the present disclosure, the engine torque, which is raised in advance, may be recovered through the engine pre-boosting control to generate electric power, the generated electric power may be stored in the battery 70 to increase system efficiency, and a torque generation delay of the engine 10 (e.g., a turbo lag in the case of using a turbo engine) may be prevented.

Here, a launch control method of a hybrid vehicle according to another embodiment of the present disclosure will be described.

Another embodiment of the present disclosure is characterized in that, when the hybrid vehicle stops while the engine is driven, the hybrid vehicle having a slip element, on which the slip control is performable between the motor and the transmission, is launchable in an HEV mode by a launch control mode. As reference drawings, FIG. 8 shows a speed graph and a torque graph illustrating a launch control method of the hybrid vehicle according to another embodiment of the present disclosure, and FIG. 9 is a diagram showing a table in which the launch control method of a hybrid vehicle according to another embodiment of the present disclosure is classified according to stages.

Unlike the above-described embodiment, the launch control method according to another embodiment of the present disclosure differently performs a process of determining an intent to execute the launch control mode in an idle state after the engine is turned on and a process of performing engine speed control, and the subsequent processes are performed in the same manner as in the above-described embodiment.

First, in a state in which an engine is turned on and in an idle state, an intent of a driver to execute the launch control mode is determined (see section ① of FIGS. 8 and 9).

For example, the HCU 100 checks an engine warm-up and an idle state in which the engine 10 is started for battery charging through the HSG 50 on the basis of data transmitted from the ECU 101. Simultaneously, when the engine clutch 30 is determined as being in an opened state, the HCU 100 determines an intent of a driver to execute the launch control mode.

The HCU 100 may check whether a driving mode is in an EV mode state, the engine 10 is in a turned-on state and an idle state, the motor speed is in the zero state, the engine clutch is in the opened state, and a slip element of the transmission input terminal is in a lock-up state through vehicle information provided from the ECU 101, the MCU 102, and the TCU 103. In addition, the HCU 100 checks the intent of the driver to execute the launch control mode on the basis of TCS on/off signals, detected signals of a BPS and an APS, and the like.

As described above, as an example of a method of checking the intent of the driver to execute the launch control mode, when the HCU 100 simultaneously receives a TCS off signal indicating that a TCS, which is a kind of braking control device for preventing idling of tire when the driver accelerates during starting or driving, is turned off, a brake pedal on signal detected by the BPS when the driver steps on a brake pedal, and an accelerator pedal on signal detected by the APS when the driver steps on an accelerator pedal at a predetermined level (e.g., APS=100%), the HCU 100 may determine that the driver has the intent to execute the launch control mode.

As described above, as another example of the method of checking the intent of the driver to execute the launch control mode, when the HCU 100 simultaneously receives the TCS off signal indicating that the TCS, which is a kind of braking control device for preventing idling of tire when the driver accelerates during starting or driving, is turned off, the brake pedal on signal detected by the BPS when the driver steps on the brake pedal, and a signal indicating that the driver selects a sport mode among an eco-mode, a normal mode, the sport mode of a driving travel mode selection switch, the HCU 100 may determine that the driver has the intent to execute the launch control mode.

Next, as described above, when the driver is determined as having the intent to execute the launch control mode, engine speed control is performed (see section ② of FIGS. 8 and 9).

For example, after the driver is determined as having the intent to execute the launch control mode, the HCU 100 transmits an engine speed control signal to the ECU 101 so that the ECU 101 performs the engine speed control at a target speed (rpm) at which the engine 10 may output a sufficient torque, i.e., a target engine speed at which the engine 10 may output a preset torque.

In this case, the engine is driven at an idle operating point or a part load operating point. However, since the engine clutch is maintained in the opened state, engine power is not transferred to the transmission input terminal.

Next, slip control with respect to the slip element (e.g., a clutch or a torque converter) of the transmission input terminal is performed in the same manner as in the above-described embodiment (see section ③ of FIGS. 8 and 9).

For example, when the HCU 100 requests the TCU 103 to perform the slip control with respect to the slip element of the transmission input terminal while controlling the engine speed at the target engine speed as described above, the TCU 103 controls to switch the slip element of the transmission input terminal from the lock-up state to a slip state and, subsequently, the HCU 100 checks whether the slip element is in the slip state. When the slip element is in the slip state, the HCU 100 transmits a motor speed control command to the MCU 102 so that the motor speed is controlled according to the target engine speed due to the motor speed control by the MCU 102.

In this case, the engine clutch is continuously maintained in the opened state, and the engine is driven at the part load operating point or the full load operating point so as to increase the engine speed to the target engine speed.

In particular, a transferred torque value, which is transmitted from the transmission 40 to the drive shaft 60 due to the slip control with respect to the slip element of the transmission input terminal, is determines as 0 Nm or a torque in which the vehicle may perform a creep launch instead of a driver request torque which is determined by an amount of depression of the accelerator pedal by the driver. The reason is to improve launch efficiency using a motor output together with an engine output in order for launch acceleration to which the acceleration intent of the driver is reflected.

Next, the engine clutch 30 between the engine 10 and the motor 20 is locked up (see section ④ of FIGS. 8 and 9).

That is, when the engine speed is synchronized with the motor speed or a difference between the engine speed and the motor speed is within a predetermined range (e.g., 300 rpm or less), the engine clutch 30 between the engine 10 and the motor 20 is locked up.

For example, the HCU 100 checks whether the engine speed reaches the target engine speed and, simultaneously, checks whether the motor speed reaches a target motor speed coincident with the target engine speed on the basis of the information from the MCU 102. When the engine speed is checked as being synchronized with the motor speed, the ECU 101 controls the engine clutch 30 to be locked up.

In particular, when whether the engine clutch 30 is locked up is checked and then the engine clutch 30 is determined as being engaged, engine pre-boosting control is performed to raise the engine torque to a torque at which battery charging is possible due to the motor 20.

For example, since the engine clutch 30 is engaged and then an output shaft of the engine 10 and a rotating shaft of the motor 20 are synchronized and connected, the ECU 101 performs the engine pre-boosting control which raises the engine torque to a torque at which the motor 20 may charge the battery 70 in addition to the transferred torque which is transmitted from the motor 20 to the drive shaft 60 through the slip element of the transmission input terminal (e.g., a torque which is not the driver request torque but allows the vehicle to perform the creep launch).

In this case, the engine 10 is continuously driven at the part load operating point or the full load operating point, and the motor 20 becomes in a state of receiving an engine pre-boosting load due to the engine pre-boosting control.

Thus, according to the engagement of the engine clutch 30, the motor 20 performs power generation driving for battery charging using the engine torque due to the engine pre-boosting control. Simultaneously, the motor 20 outputs the transferred torque to the drive shaft 60 due to the slip control with respect to the slip element of the transmission input terminal (e.g., the torque at which the vehicle may perform the creep launch instead of the driver request torque).

As described above, unlike a case in which the engine torque is wasted as thermal energy through slip in the slip element, the engine torque, which is raised in advance, may be recovered through the engine pre-boosting control to generate electric power, the generated electric power may be stored in the battery 70 to increase charging efficiency, and a torque generation delay of the engine 10 (e.g., a turbo lag in the case of using a turbo engine) may be prevented in terms of performance.

Next, a launch intent of the driver, i.e., whether the driver request torque is present, is checked and then take-up control is performed with respect to the slip element of the transmission input terminal (see section ⑤ of FIGS. 8 and 9).

For example, when the HCU 100 checks the driver request torque according to the amount of depression of the accelerator pedal by the user and then recognizes a state in which the engine 10 is synchronized with the motor speed and thus the HEV mode is possible on the basis of information received from the ECU 101 and the MCU 102, the HCU 100 commands the TCU 103 to perform take-up control.

The take-up control refers to a control process of locking up the slip element of the transmission input terminal at a level of the driver request torque (the sum of a motor torque and the engine torque) in the slip state. Even in the take-up control, the slip element of the transmission input terminal is maintained in the slip state.

Thus, as a process of the take-up control, the TCU 103 determines an ascending slope of a torque which is input to the transmission input terminal and raises the torque which is input to the transmission input terminal to the driver request torque using the determined ascending slope of the torque.

A control for satisfying the ascending slope of the torque which may be determined by the TCU 103 may be performed by controlling an ascending slope of the motor torque. This is because a degree of freedom for controlling the ascending slope of the torque of the motor 20 is higher than that of the engine 10 such that the acceleration delay may be shortened as compared with using the engine torque.

Further, the ascending slope of the torque which is determined by the TCU 103 is set to a value for preventing divergence of a rotation speed of a driving component (the engine 10 or the motor 20) of the transmission input terminal and securing launch driving ability of the vehicle due to the torque which is transmitted to the driving shaft 60.

Further, in the process of the take-up control, when a rapid progress of the take-up control is required, the engine torque may be adjusted up to the maximum engine torque.

Next, when the take-up control is terminated, the slip element of the transmission input terminal is locked up (see section ⑥ of FIGS. 8 and 9).

That is, when the TCU 103 checks that the torque which is input to the transmission input terminal is raised up to the driver request torque and the motor speed is synchronized with a rotation speed of the transmission input end, the TCU 103 locks up the lip element of the transmission input terminal.

Accordingly, a difference between the rotation speed of the transmission input terminal and the rotation speeds of the engine 10 and the motor 20 becomes smaller and thus the rotation speed of the transmission input terminal is synchronized with the rotation speeds of the engine 10 and the motor 20, and the slip element of the transmission input terminal is locked up so that output torques of the engine 10 and the motor 20 are transmitted to the drive shaft 60 without loss. Consequently, the vehicle launches in the HEV mode.

According to another exemplary embodiment of the present disclosure, in order to perform the launch control on the hybrid vehicle having the slip element on which the slip control is performable between the motor and the transmission, the execution of the launch control is determined in a state in which the engine is started and in the idle state, and then the hybrid vehicle is allowed to launch in the HEV mode through the process of synchronizing the engine speed with the motor speed, the process of engaging the engine clutch, the process of performing the slip control on the slip element of the transmission input terminal, and the process of performing the take-up control for adjusting the torque which is input to the transmission input terminal. Consequently, the launch acceleration performance of the hybrid vehicle may be improved and a maximum acceleration occurrence delay time point of the hybrid vehicle may be advanced.

Similarly, according to the above-described another exemplary embodiment of the present disclosure, the engine torque, which is raised in advance, may be recovered through the engine pre-boosting control to generate electric power, the generated electric power may be stored in the battery 70 to increase system efficiency, and a torque generation delay of the engine 10 (e.g., a turbo lag in the case of using a turbo engine) may be prevented.

The present disclosure provides the following effects through the above-described problem solving means.

First, in the hybrid vehicle having the slip element on which the slip control is performable between the motor and the transmission, the execution of the launch control mode for reflecting the acceleration intent of the user is determined in a state of setting the EV mode, and then the hybrid vehicle is allowed to launch in the HEV mode through the process of the engine starting, the process of synchronizing the engine speed with the motor speed, the process of locking up the engine clutch, the process of performing the slip control on the slip element, the process of performing the take-up control for adjusting the torque which is input to the transmission input terminal, and the process of locking up the slip element. Consequently, the launch acceleration performance of the hybrid vehicle can be improved and a maximum acceleration occurrence delay time point of the hybrid vehicle can be advanced.

Second, in the hybrid vehicle having the slip element on which the slip control is performable between the motor and the transmission, even when the hybrid vehicle launches in a state in which the engine is started, the execution of the launch control is determined, and then the hybrid vehicle is allowed to launch in the HEV mode through the process of synchronizing the engine speed with the motor speed, the process of locking up the engine clutch, the process of performing the slip control on the slip element, the process of performing the take-up control for adjusting the torque which is input to the transmission input terminal, and the process of locking up the slip element. Consequently, the launch acceleration performance of the hybrid vehicle can be improved and a maximum acceleration occurrence delay time point of the hybrid vehicle can be advanced.

Third, the engine torque which is raised can be recovered through the engine pre-boosting control to generate electric power, the generated electric power can be stored in the battery to increase charging efficiency and efficiency of an entirety of the system, and a torque generation delay of the engine (e.g., a turbo lag in the case of using a turbo engine) can be prevented.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A launch control method for a hybrid vehicle having a slip element on which a slip control is performable between a motor and a transmission, the launch control method comprising:
   determining, by a hybrid control unit (HCU), an intent of a driver to execute a launch control mode in a state in which an engine is turned-off;
   when the intent of the driver is to execute the launch control mode, starting, by an engine control unit (ECU) which has received a speed command from the hybrid control unit (HCU), the engine and controlling an engine speed;
   performing, by a transmission control unit (TCU) working cooperatively with the HCU, the slip control on the slip element of a transmission input terminal;
   when the engine speed is synchronized with a motor speed or a difference between the engine speed and the motor speed is less than a predetermined range, locking up, by the HCU, an engine clutch;
   when the engine clutch is locked up, performing, by the ECU, an engine pre-boosting control to raise an engine torque to a torque at which battery charging is available due to the motor;
   performing, by the TCU, a take-up control on the slip element; and
   when the take-up control is terminated, locking up, by the TCU, the slip element.

2. The launch control method of claim 1, wherein, in determining the intent of the driver, when a driving mode satisfies an electric vehicle (EV) mode state, an engine satisfies a turned-off state, the motor speed satisfies a zero state, the engine clutch satisfies an opened state, and the slip element satisfies a lock-up state, determining that the intent of the driver is to execute the launch control mode.

3. The launch control method of claim 1, wherein, in determining the intent of the driver, when the HCU receives a traction control system (TCS) OFF signal, a brake pedal ON signal, and an accelerator pedal ON signal, determining that the intent of the driver is to execute the launch control mode.

4. The launch control method of claim 1, wherein, in determining the intent of the driver, when the HCU receives a traction control system (TCS) OFF signal, a brake pedal ON signal, and a signal indicating a sport mode, determining that the intent of the driver is to execute the launch control mode.

5. The launch control method of claim 1, wherein starting the engine and controlling the engine speed are performed at a target engine speed at which the engine is capable of outputting a preset engine torque after engine cranking in a state in which the slip element is maintained in a lock-up state and the engine clutch is maintained in an opened state.

6. The launch control method of claim 1, wherein performing the slip control includes:
   switching the slip element from a lock-up state to a slip state in a state in which the engine clutch is opened; and
   when the slip element is in the slip state, controlling the motor speed to meet a target engine speed by a motor speed control of a motor control unit (MCU).

7. The launch control method of claim 6, wherein, a transferred torque, which is transferred from the transmission to a drive shaft due to the slip control on the slip element, is output as 0 Nm or a torque at which the vehicle performs a creep launch.

8. The launch control method of claim 1, wherein the motor is driven to perform power generation for battery charging using the engine torque in performing engine pre-boosting control, and simultaneously, to output a motor torque at which a creep launch is available with a drive shaft in performing the slip control.

9. The launch control method of claim 1, wherein performing a take-up control includes determining, by the TCU an ascending slope of a torque which is input to the transmission input terminal and raising a motor torque, which is input to the transmission input terminal, to a driver request torque with the determined ascending slope of the torque, and
   wherein the ascending slope of the motor torque, which is determined by the TCU is set by controlling an ascending slope of a motor torque.

10. The launch control method of claim 1, wherein, when a torque which is input to the transmission input terminal is checked as being raised to a driver request torque, and the motor speed is checked as being synchronized with a speed of the transmission input terminal, the locking up of the slip element of the transmission input terminal is performed.

11. A launch control method for a hybrid vehicle having a slip element on which a slip control is performable between a motor and a transmission, the launch control method comprising:
   determining, by a hybrid control unit (HCU), an intent of a driver to execute a launch control mode in a state in which an engine is turned on and in an idle state;
   when the intent of the driver is to execute the launch control mode, performing, by an engine control unit (ECU) which has received a speed command from the hybrid control unit (HCU), an engine speed control;
   performing, by a transmission control unit (TCU) operating cooperatively with the HCU, a slip control on the slip element of a transmission input terminal;
   when an engine speed is synchronized with a motor speed or a difference between the engine speed and the motor speed is less than a predetermined range, locking up, by the HCU, an engine clutch;
   when the engine clutch is locked up, performing, by the ECU, an engine pre-boosting control to raise an engine torque to a torque at which battery charging is available due to the motor;
   performing, by the TCU, a take-up control on the slip element; and
   when the take-up control is terminated, locking up, by the TCU, the slip element.

12. The launch control method of claim 11, wherein, in determining the intent of the driver, when a driving mode satisfies an electric vehicle (EV) mode state, the engine satisfies a turned-on state and the idle state, the motor speed satisfies a zero state, the engine clutch satisfies an opened state, and the slip element satisfies a lock-up state, determining that the intent of the driver is to execute the launch control mode.

13. The launch control method of claim 11, wherein, in determining the intent of the driver, when the HCU receives a traction control system (TCS) OFF signal, a brake pedal ON signal, and an accelerator pedal ON signal, determining that the intent of the driver is to execute the launch control mode.

14. The launch control method of claim 11, wherein, in determining the intent of the driver, when the HCU receives a traction control system (TCS) OFF signal, a brake pedal ON signal, and a signal indicating a sport mode, determining that the intent of the driver is to execute the launch control mode.

15. The launch control method of claim 11, wherein performing the engine speed control is performed at a target engine speed at which the engine is capable of outputting a preset torque in a state in which the slip element is maintained in a lock-up state and the engine clutch is maintained in an opened state.

16. The launch control method of claim 11, wherein performing slip control on the slip element includes:
   switching the slip element from a lock-up state to a slip state in a state in which the engine clutch is opened; and
   when the slip element is in the slip state, controlling the motor speed to meet a target engine speed by a motor speed control of a motor control unit (MCU).

17. The launch control method of claim 16, wherein a transferred torque, which is transferred from the transmission to a drive shaft due to the slip control on the slip element, is output as 0 Nm or a torque at which the vehicle performs a creep launch.

18. The launch control method of claim 11, wherein the motor is driven to perform power generation for battery charging using the engine torque in performing the engine pre-boosting control, and, simultaneously, to output a torque at which a creep launch is available with a drive shaft in performing the slip control on the slip element.

19. The launch control method of claim 11, wherein the performing a take-up control includes determining an ascending slope of a torque which is input to the transmission input terminal and raising the torque, which is input to the transmission input terminal, to a driver request torque with the determined ascending slope of the torque, and
   wherein the ascending slope of the torque, which is determined by the TCU, is set by controlling an ascending slope of a motor torque.

20. The launch control method of claim 11, wherein, when a torque which is input to the transmission input terminal is raised to a driver request torque, and the motor speed is synchronized with a speed of the transmission input terminal, the locking up of the slip element is performed.

* * * * *